United States Patent [19]

Cohen

[11] 4,448,891

[45] May 15, 1984

[54] ZEOLITE L CATALYST FOR REFORMING

[75] Inventor: Abraham D. Cohen, Sarnia, Canada

[73] Assignee: Exxon Research & Engineering Co., Florham Park, N.J.

[21] Appl. No.: 426,211

[22] Filed: Sep. 28, 1982

[51] Int. Cl.³ .......................... B01J 29/32; B01J 29/12
[52] U.S. Cl. ........................................ 502/74; 502/66
[58] Field of Search ................ 252/455 Z; 502/74, 66

[56] References Cited

U.S. PATENT DOCUMENTS

| | | | |
|---|---|---|---|
| 3,418,256 | 12/1968 | Rigney et al. | 252/455 Z |
| 3,867,512 | 2/1975 | Young | 252/455 Z |
| 4,048,111 | 9/1977 | Rosback et al. | 252/455 Z |

Primary Examiner—Carl F. Dees
Attorney, Agent, or Firm—Mitchell D. Bittman

[57] ABSTRACT

An improved reforming catalyst employing a zeolite L support is provided by soaking the zeolite L in an alkali solution having a pH of at least 11 for a time and at a temperature effective to increase the period of time over which the catalytic activity of the catalyst is maintained.

21 Claims, 1 Drawing Figure

FIGURE I
(0.6 WT% Pt) K-ZEOLITE L,
C$_6$ MIXED FEED AT STANDARD REFORMING CONDITIONS
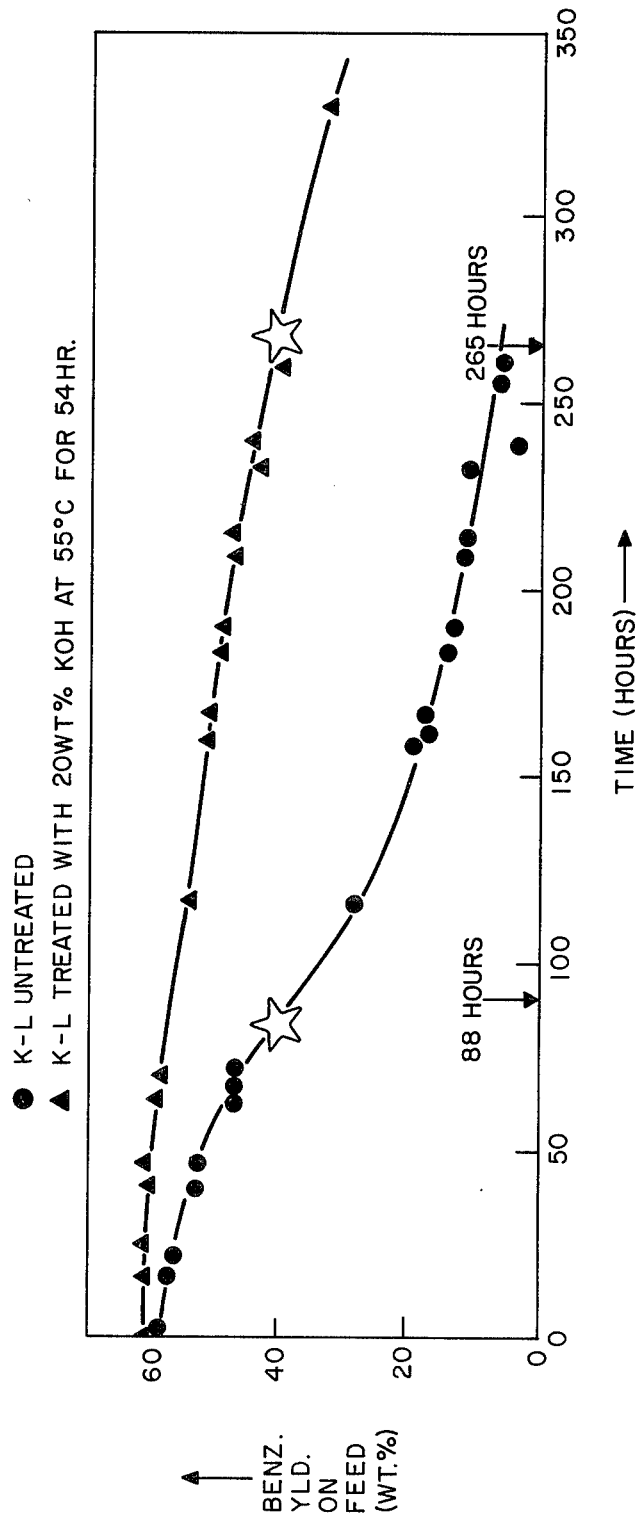

ZEOLITE L CATALYST FOR REFORMING

BACKGROUND OF THE INVENTION

This invention relates to an improved zeolite L-based catalyst and the use of this zeolite L-based catalyst in a reforming process, and more particularly to a zeolite L-based catalyst in which the catalytic activity is maintained for an increased period of time. Further, this invention provides an improved reforming process in which the improved zeolite L-based catalyst produces aromatic hydrocarbons at high yields and selectivity for an increased period of time.

The catalytic reforming reaction is conventionally used in the oil industry for converting paraffins into aromatic hydrocarbons. Conventional methods of catalytic reforming are based on the use of catalysts comprising a noble metal on a carrier. Common catalysts of this kind are based on alumina carrying platinum and optionally a second metal such as rhenium. Use of carriers other than alumina, such as X and Y zeolites have also been proposed provided the reactant and products are sufficiently small to flow through the pores of the zeolites.

In conventional catalytic reforming processes hydrocarbons, preferably $C_6$ to $C_{10}$ paraffins, are converted to aromatics by passing the hydrocarbons over the catalyst in the presence of hydrogen at operating conditions generally within the temperature range of about 400° C. to 565° C. and pressures varying from 200 kPa to 3.5 MPa at $H_2$/feed mole ratios of at least 3 and at LHSV of 0.2 to 5 W/W/HR. Part of the hydrocarbon feed is converted into aromatics by dehydrocyclization, but the reaction is also accompanied by isomerization and hydrocracking reactions. The latter converts some of the hydrocarbon feed, resulting in an undesirable loss of selectivity of $C_4$-gaseous hydrocarbons. The aromatic yield and selectivity of the reforming process varies with the reaction conditions and type of catalyst. High aromatic yield is desired, but not at a disproportionate loss to $C_4$-hydrocarbons, or at a significant lessening of catalyst life.

One particularly suitable catalyst for reforming employs a type L zeolite support which has shown to be more selective with regard to the dehydrocyclization reaction, thus providing a high yield of aromatic hydrocarbons as disclosed in U.S. Pat. No. 4,104,320. However, one problem encountered in the use of a catalyst based on zeolite L is that the catalytic activity of the catalyst cannot be maintained for an extended period of time.

During the reforming process, the zeolite L-based catalyst is deactivated fairly rapidly, for example, on the order of 50 to 150 hours, generally by the agglomeration of the noble metal on the catalyst and/or the formation of coke on the catalyst. While regeneration may be carried out, this is a time consuming and involved procedure which requires the reforming reactor to be shut down. Thus, economically a commercial reforming process typically requires the catalyst to be active at high conversion rates for extended periods of time. For a zeolite L-based catalyst it is desirable to maintain catalytic activity for at least 250 hours.

Thus, a basic feature of this invention is to provide an improved reforming catalyst employing a zeolite L support which maintains the catalytic activity (high yield of aromatics) for an extended or increased period of time.

SUMMARY OF THE INVENTION

Briefly, this invention provides an improved reforming catalyst employing a zeolite L support by soaking the zeolite L in an alkali solution having a pH of at least 11 for a time and at a temperature effective to increase the period of time over which the catalytic activity of the catalyst is maintained. The catalyst, based on zeolite L will have exchangeable cations of which at least 90% are alkali metal ions selected from sodium, lithium, potassium, rubidium, barium, and cesium and containing at least one metal selected from Group VIII of the periodic table of elements having a dehydrocyclizing effect. The alkali soak is carried out prior to calcining the dehydrocyclizing metal loaded zeolite L.

BRIEF DESCRIPTION OF THE DRAWING

This invention will be better understood and its advantages will become more apparent from the following detailed description, especially when read in light of the attached drawing wherein:

FIG. I is a chart of the results of Experiment I which compares under reforming conditions the benzene yield over time of an alkali soaked Pt-K zeolite L catalyst versus an untreated Pt-K zeolite L.

DETAILED DESCRIPTION OF THE INVENTION

The improved catalyst and the resultant improved reforming process of this invention are achieved by soaking the zeolite L in an alkali solution having a pH of at least 11 for a time and at a temperature effective to increase the period of time over which the catalytic activity of the catalyst is maintained under reforming conditions. This alkali soak is carried out prior to calcining the dehydrocyclizing metal loaded zeolite L. The zeolite L support will be charged with one or more dehydrocyclizing metals to provide the reforming catalytic activity.

Type L zeolites are synthetic zeolites which crystallize in the hexagonal system with a characteristic X-ray diffraction spectrum. A theoretical formula is $M_{9/n}[(AlO_2)_9(SiO_2)_{27}]$. The real formula may vary by for example, the ratio of silicon to aluminum varying from 2.5 to 3.5. A general formula for zeolite L may be represented as follows:

$$0.9-1.3M_2O:Al_2O_3:5.0-7.0SiO_2:yH_2O$$

wherein "M" designates at least one exchangeable cation; "n" represents the valence of "M"; and "y" may be any value from 0 to about 9. A more complete description of zeolite L is given in U.S. Pat. No. 3,216,789 which more particularly gives a conventional description of zeolite L with respect to the X-ray diffraction spectrum. The zeolite L has channel shaped pores and may occur in the form of cylindrical crystals as well as other shapes. The crystals may be a thousand to fifty thousand angstroms in diameter. The hydrocarbon sorption pores are channels parallel to the cylindrical axis and are between about 7 and 8 angstroms in diameter. The K zeolite L as prepared is a basic zeolite, thus an alkali wash or ion exchange to reduce acidity is not required.

Type L zeolites are conventionally synthesized in a potassium form. The cation is exchangeable so that, for example, a zeolite L in its potassium form can be subjected to an ion exchange treatment in an aqueous solution of appropriate salts to provide a zeolite L containing other cations.

The reforming catalysts are based upon zeolite L in which at least 90% of the exchangeable cations are ions of at least one alkali metal chosen from potassium, barium, lithium, sodium, rubidium and cesium. In a preferred embodiment, the alkali metal cation is chosen from potassium, cesium and rubidium. Combinations of these ions may also be used. For example, a zeolite L in a potassium form can be ion exchanged by treatment with an aqueous solution containing a rubidium and/or cesium salt, after which the zeolite is washed to eliminate excess ions. The percent of ions exchanged can be increased by repeating the ion exchange treatment of the zeolite. However, since it is difficult to exchange more than 80% of the original cation in the final product, the process yields zeolite L in which at least 90% of the exchangeable cations are potassium ions and rubidium and/or cesium ions.

The zeolite L-based catalyst is charged with one or more dehydrocyclizing metals chosen from Group VIII of the periodic table of elements, and optionally additionally containing rhenium, tin and germanium. The preferred Group VIII metals are platinum, palladium and iridium, with the most preferred metal being platinum. In one embodiment, platinum is combined with one of the metals of rhenium, iridium, tin or germanium to provide a desired reforming catalyst. The level of the dehydrocyclizing metal will generally range from 0.1 to 6.0% by weight of the catalyst. The level for platinum is 0.1 to 6.0%, preferably 0.2 to 5.0% by weight of the catalyst.

The dehydrocyclizing metals are introduced into the zeolite L support by impregnation or ion exchange in an aqueous solution of the appropriate salt. Platinum can be introduced on the support by the methods described in the prior art, such as impregnation with an aqueous solution of a salt or of a platinum complex such as hexachloroplatinic acid, dinitrodiaminoplatinum or platinum tetramine dichloride or by deposit through ion exchange with an aqueous solution of a platinum cationic complex like platinum tetramine dichloride. If more than one metal is to be introduced in the catalyst, solutions containing salts of each metal may be introduced simulataneously or sequentially. The zeolite L-based catalysts may further contain sulfur to increase selectivity by decreasing $C_4$-production in the subsequent reforming process.

The zeolite L-based catalyst as described above, especially the preferred platinum-potassium zeolite L catalyst, exhibits very high yields of hydrocarbons to aromatics coupled with low rates of conversion of feed to $C_4$-hydrocarbons. In a standardized test of a reforming process utilizing a 0.6 wt. % Pt-K zeolite L catalyst on a mixed $C_6$ hydrocarbon feed, the yield of aromatics will initially be about 60 weight % of the feed. However, the catalyst will deactivate fairly rapidly, typically on the order of about 50 to 150 hours, depressing the aromatic (i.e. benzene) yield to below 40 weight % of the feed. With the alkali soak of this invention, while the initial catalytic activity and aromatic (benzene) yield may not be increased, the catalyst will maintain its catalytic activity, i.e. yield to aromatics (benzene) of at least 40 weight % of the feed for an increased period of time, preferably over 250 hours.

The zeolite L is soaked in an alkali solution having a pH of at least 11 for a time and at a temperature effective to increase the period of time over which the catalytic activity of the catalyst is maintained under reforming conditions. Generally, the alkali soak is effective to increase the time by at least 50 hours over which the catalytic activity (aromatic yield) is maintained. Preferably, the alkali soak provides a zeolite L-based reforming catalyst which under reforming conditions will convert a mixed $C_6$ hydrocarbon feed to benzene at a yield of at least 40% by weight of the feed for at least 250 hours, preferably at least 300 hours. The above aromatic yields over time (catalyst life) are based upon a standardized test utilizing a mixed $C_6$ hydrocarbon feed containing 60 weight % hexane, 30 weight % 3-methylpentane and 10% weight % methylcyclopentane and based on reforming conditions of about 500° C., 690 KPa, LHSV of 2.5 W/W/HR and an $H_2$/oil ratio of 6.

The degree of soaking of the zeolite L in an alkali solution to provide an increase in catalyst life is dependent upon the variables of time, temperature and pH. With a lower pH, a longer soaking time and higher temperature will be required to provide the effective increase in catalyst life. The severity of the alkali soak is also dependent on the particular zeolite L, as different batches of zeolite L may vary in purity (e.g. contamination with other structures) and particle size, thus requiring different degrees of alkali soak to effectively increase catalyst life. To measure the effectiveness of the alkali soak on the zeolite L, the catalyst life (aromatic yield over time) of the resulting catalyst is measured.

One effect of the alkali soak is that silica is preferentially removed from the type L zeolite. Thus, the alkali soak removes broadly from 0.05 to 30% by weight of the silica and preferably removes from 0.1 to 15% by weight of the silica from the zeolite L, provided that substantial loss of crystallinity or destruction of crystal structure is avoided. The alkali soak also decreases the $SiO_2/Al_2O_3$ ratio.

Another effect of the alkali soak is the NMR (nuclear magnetic resonance) of the zeolite L is changed indicating a removal of silica from the crystal lattice without destruction of the crystal structure. A still further effect is the X-ray diffraction shows the reduction of impurity zeolite W in the zeolite L material. Still further, the alkali soak slightly changes the X-ray diffraction pattern of zeolite L indicating an expansion by as much as 0.12 A° in the $a_o$ lattice dimension of 18.342 A°.

The alkali soak of this invention is substantially different from an ion exchange, a simple neutralization of residual acidity after calcining or reduction of acidity of a zeolite itself which is suggested by the art (e.g. see U.S. Pat. Nos. 3,216,789, 3,953,365, and 4,104,320). An ion exchange is generally carried out under mild conditions with minimal effect on the support itself. The neutralization of residual acidity after calcining is generally carried out under mild conditions simply to remove any residual acidity or hydrogen ions remaining after ion exchange and calcining with minimal effect on the support itself. In comparison, the alkali soak of the instant invention is an extended treatment under severe conditions, which is critically carried out prior to calcining the dehydrocyclizing metal loaded zeolite L to fundamentally change the characteristics of the catalyst support itself and provide a catalyst with increased life. The differences are demonstrated in the preparation of zeolite L catalyst, in that while neutralization of residual acidity after calcining is suggested (see U.S. Pat. No. 4,104,320), the resultant zeolite L does not exhibit extended catalytic life. Further, the reduction of acidity of an acidic zeolite such as ZSM-5 as suggested by European Patent Application 80303065.9 would generally be inappropriate for zeolite L, as K zeolite L as prepared is a basic zeolite.

The alkali soak is critically carried out at a pH of greater than 11, preferably at a pH of 13 to 16. Various alkalies that provide this pH may be employed. Preferably the alkali has a cation chosen from sodium, potassium, rubidium, cesium, strontium and barium and has an anion chosen from hydroxide, carbonate, borate and phosphate, or combinations thereof. The preferred alkalies are potassium hydroxide, rubidium hydroxide, cesium hydroxide or combinations thereof. While preferably the alkali solution is an aqueous solution, other solvents such as alcohol, alcohol and water etc. may be employed. The interdependent variables of pH, temperature and time of soaking must be controlled to provide the desired effect on the catalyst. Generally, the soaking is carried out under continuous agitation and the temperature of the soaking will range between $-20°$ to $200°$ C., preferably $25°$ to $120°$ C., and the time will vary between 15 minutes to three weeks, with the preferred time period being five hours to eighty hours. The soaking itself can be carried out as one continuous extended soak or as a series of soaks, followed by washing. Once the alkali soak of the desired degree is achieved, then the zeolite L is washed, preferably in the solvent to remove excess ions, followed by drying the zeolite L.

The alkali soak can be carried out on the zeolite L before or after it is charged with the dehydrocyclizing metal. However, in order to avoid loss of this dehydrocyclizing metal which can be expensive in the case of platinum, the alkali soak is preferably carried out prior to the charging of the dehydrocyclizing metal on the zeolite L support. Critically, the alkali soak is carried out on the zeolite L before the dehydrocyclizing metal loaded zeolite L is calcined to activate the catalyst. After calcining, the alkali soak does not effectively extend the catalyst life. The zeolite L is preferably shaped into an appropriate size and shape for subsequent use as a reforming catalyst. The shaping can be carried out with or without a binder, with care being taken in that the binder chosen should not detrimentally affect the reforming process by substantially reducing the catalytic activity. The alkali soak is preferably carried out without a binder present to insure the desired effect on the zeolite L itself, versus simply neutralizing the acidity of the binder.

The zeolite L based catalyst as improved by the alkali soak is then suitable for use for an extended period of time in a reforming process. In general, the reforming process is carried out at: temperatures of $400°$ C. to $550°$ C., preferably $450°$ C. to $520°$ C.; pressures of 200K Pa to 2 M Pa, preferably 517K Pa to 1.2 M Pa; a liquid hourly space velocity (LHSV) of 0.5 to 20 W/W/HR, preferably 1 to 10 W/W/HR; and at $H_2$/oil mole ratios of 2 to 20, preferably 4 to 10. While various hydrocarbon feeds may be used, the preferred feed contains paraffins having 6 to 10 carbon atoms.

A number of catalyst were prepared and tested under reforming conditions in the following examples. The standard reforming conditions employed in the examples involved utilizing a mixed $C_6$ hydrocarbon feed containing 60 weight % normal hexane, 30 weight % 3-methylpentane and 10 weight % methylcyclopentane, and reforming conditions comprising a temperature of about $500°$ C., pressures of 690 kPa (100 psig), LHSV of 2.5 grams feed per hour per gram of catalyst and at an $H_2$/oil mole ratio of 6. Useful catalyst life for these experiments was defined as the time period required to maintain a benzene yield of at least 40% by weight of the feed. The catalysts tested were platinumpotassium zeolite L with the level of platinum indicated (% by weight of catalyst) being loaded on the zeolite L support, after any alkali soak, by ion exchange with $Pt(NH_3)_4Cl_2$ dissolved in water, followed by drying and then calcining at $480°$ C. for three hours.

EXAMPLE I

Prior to loading the platinum on zeolite L, 30 grams of K zeolite L was soaked in 200 cc of an aqueous solution containing 20 weight % of KOH at a pH of about 14.5. The slurry was continually stirred while the temperature of the solution was maintained at $55°$ C. for 18 hours. The alkali soaked zeolite was then washed with water followed by repeating the soaking in the KOH solution for two additional 18 hour periods, for a total alkali soaking time of 54 hours. Washing was then repeated until the pH of the zeolite wash water was at or below 10.5, followed by drying at $110°$ C. The alkali soaked K zeolite L was then loaded with 0.6 wt. % platinum and compared under standard reforming conditions with a mixed $C_6$ hydrocarbon feed against 0.6 wt. % Pt-K zeolite L which has not been alkali soaked. Table I lists the benzene yield in weight % of feed over time for the alkali soaked Pt-K zeolite L and the untreated Pt-K zeolite L, the results of which are plotted in FIG. 1.

The 0.6 wt. % Pt-K zeolite L which was alkali soaked demonstrated a useful catalyst life (i.e., a benzene yield of at least 40 weight % of the feed) for about 265 hours as compared to about 88 hours for the untreated 0.6 wt. % Pt-K zeolite L.

TABLE I

| Untreated 0.6 wt. % Pt—K Zeolite L | | Alkali Soaked 0.6 wt. % Pt—K Zeolite L | |
|---|---|---|---|
| Time (hrs) | Benzene Yield (wt. %) | Time (hrs) | Benzene Yield (wt. %) |
| 0.25 | 51.7 | .25 | 46.6 |
| 1 | 60.3 | 1 | 61 |
| 18 | 57.8 | 19 | 61.6 |
| 25 | 56.8 | 26 | 61.8 |
| 42 | 53.5 | 43 | 60.1 |
| 49 | 53 | 49 | 60.8 |
| 66 | 47.9 | 67 | 59.4 |
| 73 | 47.3 | 73 | 58.7 |
| 118 | 28.2 | 119 | 53.9 |
| 162 | 18.7 | 163 | 51.6 |
| 186 | 14.4 | 187 | 49.4 |
| 193 | 13.1 | 193 | 49 |
| 217 | 11.5 | 217 | 47.6 |
| 235 | 11.0 | 236 | 43.9 |
| 242 | 3.8 | 242 | 44.9 |
| 263 | 6.4 | 263 | 40.7 |
|  |  | 265 | 40.5 |
|  |  | 332 | 32.4 |

EXAMPLE II

A zeolite L base was alkali soaked as specified in Example I, then loaded with 1.0 wt. % platinum and compared under standard reforming conditions with a mixed $C_6$ hydrocarbon feed against an untreated 1.0 wt. % Pt-K zeolite L. Table II lists the benzene yield in weight % of feed over time for the alkali soaked Pt-K zeolite L and the untreated Pt-K zeolite L.

The 1.0 wt. % Pt-K zeolite L which was alkali soaked demonstrated a useful catalyst life of about 285 hours as compared to about 142 hours for the untreated 1.0 wt. % Pt-K zeolite L.

TABLE II

| Untreated 1.0 wt. % Pt—K Zeolite L | | Alkali Soaked 1.0 wt. % Pt—K Zeolite L | |
|---|---|---|---|
| Time (hrs) | Benzene Yield (wt. %) | Time (hrs) | Benzene Yield (wt. %) |
| .25 | 55.4 | 0.25 | 10.7 |
| 1 | 63.8 | 1 | 45.6 |
| 19 | 62.5 | 2 | 48.4 |
| 26 | 59.7 | 19 | 55.5 |
| 43 | 57.3 | 25 | 55 |
| 50 | 55.5 | 43 | 54.4 |
| 115 | 44.1 | 95 | 52 |
| 121 | 42.7 | 139 | 49.7 |
| 139 | 40.4 | 145 | 49.2 |
| 146 | 39.7 | 164 | 48.6 |
| 165 | 36.4 | 187 | 46.6 |
| 166 | 37 | 214 | 44.9 |
|  |  | 235 | 43.4 |
|  |  | 237 | 42.8 |
|  |  | 307 | 38.2 |
|  |  | 308 | 38.8 |

EXAMPLE III

Prior to loading the platinum on zeolite L, 30 grams of K-zeolite L (same K-zeolite L as used in Example I) was soaked in 200 cc of an aqueous solution containing 10 weight % of KOH at a pH of about 14.2. The slurry at room temperature (25° C.) was continuously stirred for 3 days. The soaked zeolite was repeatedly washed in water to remove excess KOH until the pH of the wash water was at 10.5 or below. The soaked zeolite was then loaded with 0.6 wt. % platinum and tested under standard reforming conditions with a mixed $C_6$ hydrocarbon feed. Table III lists the benzene yield in weight % of feed over time for the alkali soaked zeolite.

The alkali soaked 0.6 wt. % Pt K zeolite L demonstrated a useful catalyst life of about 350 hours as compared to about 88 hours for the untreated 0.6 Pt K zeolite L (see Example I).

TABLE III

| Alkali Soaked 0.6 wt. % Pt Zeolite L | |
|---|---|
| Time (hrs) | Benzene Yield (wt. %) |
| .3 | 50.7 |
| 1 | 55.2 |
| 19 | 59.8 |
| 25 | 58.2 |
| 44 | 58.1 |
| 67 | 57.7 |
| 142 | 54.7 |
| 164 | 53.3 |
| 187 | 54.1 |
| 194 | 53 |
| 211 | 52.1 |
| 235 | 51.8 |
| 260 | 48.4 |
| 331 | 43.1 |
| 338 | 42.1 |
| 348 | 40.6 |
| 353 | 39.4 |
| 371 | 37.5 |
| 373 | 37.8 |

EXAMPLE IV

Prior to loading the platinum on zeolite L, 50 grams of K zeolite L was soaked in 200 cc of an aqueous solution containing 50 weight % of KOH at a pH of about 15. The slurry was heated to 110° C. and stirred continuously for 18 hours. The soaked zeolite was repeatedly washed in water until the pH of the wash water was at 10.5 or below. The alkali soaked zeolite was then loaded with 1.0 wt. % platinum and tested under standard reforming conditions with a mixed $C_6$ hydrocarbon feed. Table IV lists the benzene yield in weight % of feed over time for the untreated and the alkali soaked zeolite L.

The alkali soaked 1.0 wt. % Pt K zeolite L demonstrated a useful catalyst life of about 190 hours as compared to 0 hours for an untreated 1.0 wt. % Pt K zeolite L.

TABLE IV

| Untreated 1.0 wt. % Pt K—Zeolite L | | Alkali Soaked 1.0 wt. % Pt K—Zeolite L | |
|---|---|---|---|
| Time (hrs) | Benzene Yield (wt. %) | Time (hrs) | Benzene Yield (wt. %) |
| 2.5 | 32% | .25 | 50.1 |
| 19 | 28% | 1 | 53.8 |
| 20 | 28% | 18 | 52.9 |
|  |  | 24 | 53 |
|  |  | 42 | 51 |
|  |  | 48 | 51.4 |
|  |  | 138 | 42 |
|  |  | 145 | 42.9 |
|  |  | 162 | 41.7 |
|  |  | 168 | 42.4 |
|  |  | 190 | 39.8 |
|  |  | 192 | 39.1 |

EXAMPLE V

A zeolite-L support (same K-zeolite L as used in Example IV) was alkali soaked as specified in Example I, then loaded with 1.0 wt. % platinum and compared under standard reforming conditions with a mixed $C_6$ hydrocarbon feed against an untreated 1.0 wt. % Pt-K zeolite L. Table V lists the benzene yield in weight % of feed over time for the alkali soaked catalyst.

The 1.0 wt. % Pt-K zeolite L which was alkali soaked demonstrated a useful catalyst life of about 535 hours as compared to 0 hours for the untreated 1.0 wt. % Pt-K zeolite L (see Example IV).

TABLE V

| Alkali Soaked 1 wt. % Pt—K Zeolite L | |
|---|---|
| Time (hrs) | Benzene Yield (wt. %) |
| .25 | 16.7 |
| 1 | 57.5 |
| 19 | 60.5 |
| 23 | 60.6 |
| 44 | 60.8 |
| 68 | 59.4 |
| 91 | 58.9 |
| 96 | 59.4 |
| 164 | 58 |
| 188 | 57.6 |
| 212 | 57.5 |
| 236 | 55.5 |
| 259 | 54.7 |
| 331 | 52.6 |
| 355 | 52.6 |
| 379 | 50.4 |
| 403 | 49.7 |
| 499 | 43.7 |

TABLE V-continued

Alkali Soaked
1 wt. % Pt—K Zeolite L

| Time (hrs) | Benzene Yield (wt. %) |
|---|---|
| 523 | 42.3 |
| 528 | 42.7 |
| 548 | 38.9 |
| 553 | 39.2 |
| 572 | 36.9 |

EXAMPLE VI

After loading 0.6 wt. % of platinum on zeolite L (same K-zeolite L as used in Example I), the zeolite L was dried and then calcined at 480° C. for three hours. Following calcining, 10 grams of the 0.6 wt. % Pt-K zeolite L was alkali soaked in 70 cc of an aqueous solution containing 10 wt. % KOH at a pH of about 14.2. The slurry was continually stirred while the temperature was maintained at 25° C. for 3 days. The alkali soaked zeolite was then washed until the pH of the wash water was at 10.5 or below, followed by drying. Table VI lists the benzene yield in weight % of feed over time for the zeolite L which was alkali soaked after calcining the platinum loaded zeolite L.

The 0.6 wt. % Pt-K zeolite L which was alkali soaked after calcining the dehydrocyclizing metal (platinum) loaded zeolite L demonstrated a useful catalyst life of about 3 hours as compared to about 88 hours for the untreated 0.6 wt. % Pt-K zeolite L (see Example I) and as compared to an alkali soak prior to calcining the 0.6 wt. % Pt-K zeolite L which demonstrated a useful catalyst life of about 350 hours (see Example III). Thus, no improvement in useful catalyst life is shown for alkali soaking after calcining the dehydrocyclizing metal loaded zeolite L.

TABLE VI

Alkali Soaked After Calcining
0.6 wt. % Pt—K Zeolite L

| Time (hrs) | Benzene Yield (wt. %) |
|---|---|
| .25 | 55% |
| 1.25 | 53% |
| 2 | 47% |
| 4 | 34% |
| 5 | 39% |

What is claimed is:

1. A catalyst for hydrocarbon reforming comprising a zeolite having exchangeable cations of which at least 90% are metal ions selected from the group consisting of sodium, barium, lithium, potassium, rubidium and cesium and containing at least one metal selected from the group consisting of Group VIII of the periodic table of elements and having a dehydrocyclizing effect, said zeolite produced by soaking a type L zeolite prior to calcining the dehydrocyclizing metal loaded zeolite in an alkali solution having a pH of at least 11 for a time and at a temperature effective to increase the period of time over which the catalytic activity of the catalyst is maintained under reforming conditions.

2. Catalyst of claim 1 wherein the alkali soak is carried out to preferentially remove silica from the type L zeolite without substantial loss of crystallinity.

3. Catalyst of claim 2 wherein 0.1 to 15% by weight of the silica is removed from said zeolite.

4. Catalyst of claim 1 wherein the alkali soak is effective to increase by at least 50 hours the time period over which catalytic activity is maintained, based on a standardized test utilizing a hydrocarbon feedstock containing 60 weight % hexane, 30 weight % 3-methylpentane and 10 weight % methylcyclopentane and on reforming conditions of about 500° C., 690 KPa, space velocity of 2.5 W/W/HR and an H$_2$/oil mole ratio of 6.

5. Catalyst of claim 1 wherein the alkali of the alkali solution has a cation chosen from the group consisting of sodium, potassium, rubidium, cesium, strontium, barium and mixtures thereof, and has an anion chosen from the group consisting of hydroxide, carbonate, phosphate, borate and mixtures thereof.

6. Catalyst of claim 5 wherein the alkali solution is an aqueous solution.

7. Catalyst of claim 6 wherein the soaking is carried out under agitation, the pH of the alkali solution is 13 to 16, the temperature of soaking is between 25 and 120° C. and the soaking time is between 5 and 80 hours.

8. Catalyst of claim 7 wherein the alkali is chosen from the group consisting of potassium hydroxide, cesium hydroxide and rubidium hydroxide.

9. Catalyst of claim 8 further comprising washing the soaked zeolite to remove excess alkali, followed by drying the zeolite.

10. Catalyst of claim 1 wherein the zeolite contains at least one alkali metal selected from the group consisting of potassium, rubidium and cesium and contains from 0.1 to 6.0 % by weight of at least one dehydrocyclizing metal selected from the group consisting of platinum, palladium and iridium.

11. Catalyst of claim 10 wherein the zeolite additionally contains at least one metal chosen from the group consisting of rhenium, tin and germanium.

12. Catalyst of claim 10 wherein the zeolite catalyst further contains sulfur.

13. Catalyst of claim 8 wherein the zeolite contains potassium and 0.2 to 5% by weight of platinum.

14. Catalyst of claim 1 wherein the zeolite is charged with the dehydrocyclizing metal after the alkali soak.

15. Catalyst of claims 1, 4, 8, 10 or 14 further comprising shaping the soaked zeolite.

16. Catalyst of claims 1, 3, 7, 8 or 10 wherein the alkali soak is effective to increase the time to at least 250 hours over which the catalytic activity of the catalyst is maintained at a level of at least a 40 weight % conversion to aromatics, based on a standardized test utilizing a hydrocarbon feedstock containing 60 weight % hexane, 30 weight % 3-methylpentane and 10 weight % methylcyclopentane and on reforming conditions of about 500° C., 690 KPa, space velocity of 2.5 W/W/HR and an H$_2$/oil mole ratio of 6.

17. Catalyst of claim 16 wherein the alkali soak is effective to maintain catalytic activity for at least 300 hours.

18. A zeolite suited for use as a catalyst support comprising:
a zeolite produced by soaking a type L zeolite in an alkali solution having a pH of at least 11 for a temperature and a period of time effective to increase the period of time over which the catalytic activity is maintained when said zeolite is loaded with a catalytically active metal, said soaking carried out prior to calcining the zeolite when it is loaded with a dehydrocyclizing metal.

19. Zeolite of claim 18 wherein 0.05 to 30 weight % of the silica is removed from said zeolite.

20. Zeolite of claims 18 or 19 wherein the soaking is carried out under agitation, the pH of the alkali solution is 13 to 16, the temperature of soaking is between 25 and 120° C. and the soaking time is between 5 and 80 hours.

21. Zeolite of claim 18 wherein said soaking is carried out prior to loading the zeolite with a dehydrocyclizing metal.

* * * * *